United States Patent [19] [11] 3,917,218
Marocco [45] Nov. 4, 1975

[54] DIFFERENTIAL SOLENOID VALVE FOR FLUID CONTROL

[75] Inventor: Antonio Marocco, Arma di Taggia (Imperia), Italy

[73] Assignee: Elge Establishment, Liechtenstein, Liechtenstein

[22] Filed: June 17, 1974

[21] Appl. No.: 480,173

[30] Foreign Application Priority Data
June 18, 1973 Italy .................................. 68804/73

[52] U.S. Cl. ...................... 251/30; 251/38; 251/367
[51] Int. Cl.² ......................................... F16K 31/06
[58] Field of Search ........... 251/30, 38, 45, 61, 129, 251/141, 367

[56] References Cited
UNITED STATES PATENTS

| | | | |
|---|---|---|---|
| 2,735,047 | 2/1956 | Garner et al. | 251/129 |
| 3,630,482 | 12/1971 | Beller | 251/30 |
| 3,672,627 | 6/1972 | McCarty, Jr. et al. | 251/30 |
| 3,707,992 | 1/1973 | Ellison et al. | 251/129 |
| 3,740,019 | 6/1973 | Kessell et al. | 251/129 |
| 3,784,154 | 1/1974 | Ostrowski et al. | 251/30 |

Primary Examiner—Martin P. Schwadron
Assistant Examiner—George L. Walton
Attorney, Agent, or Firm—Sughrue, Rothwell, Mion, Zinn & Macpeak

[57] ABSTRACT

A differential solenoid valve of the type comprising a a valve body having an annular outer chamber communicating with a valve inlet and with a coaxial inner chamber which communicates with a valve outlet, a diaphragm movable to open or close the communication between the said inner and outer chambers in dependence on the difference in pressure between the outer chamber and a pilot chamber which has an outlet to the valve outlet controlled by a movable electromagnet core, in which the electromagnet cone is housed in an intermediate element which is attached to the valve body by a simple bayonet coupling and the electromagnet is attached to the intermediate element by snap engaging teeth or to the valve body by a bayonet coupling. This arrangement permits assembly by automatic machinery.

8 Claims, 10 Drawing Figures

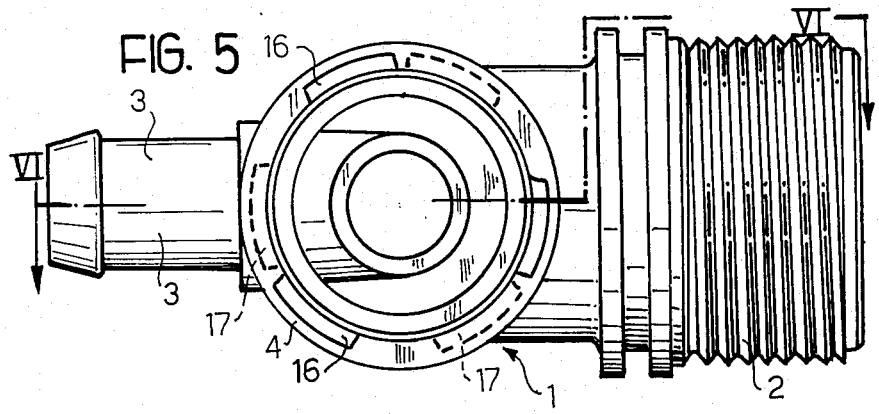
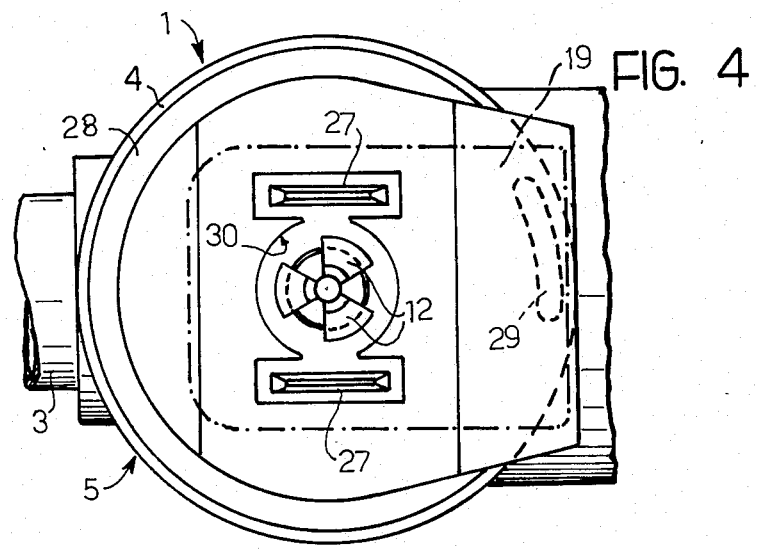
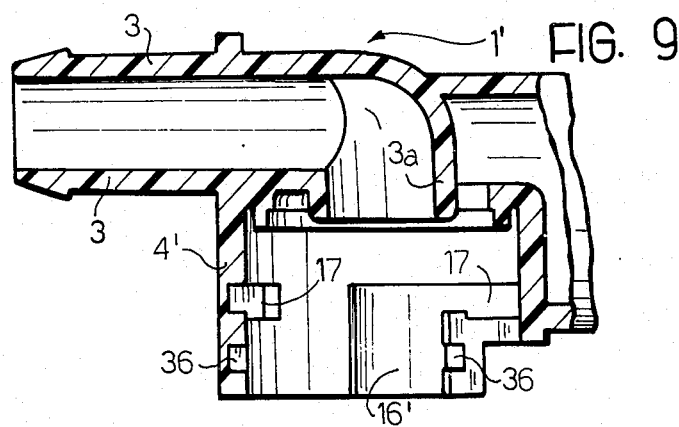

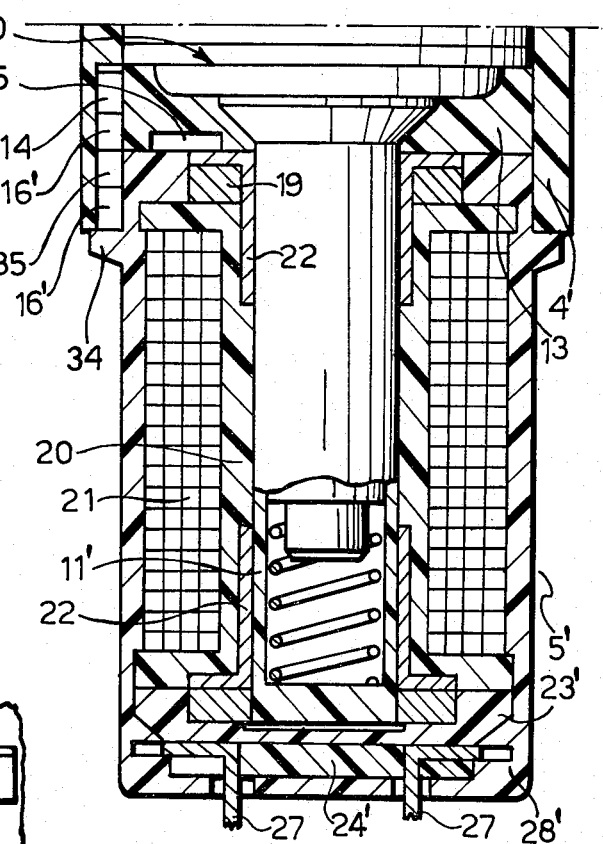
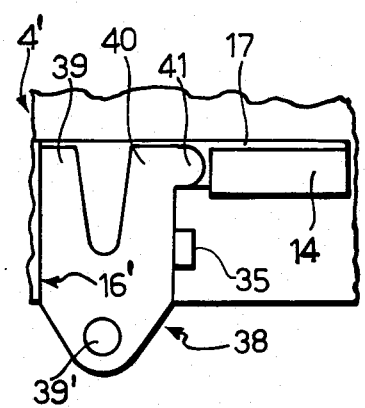
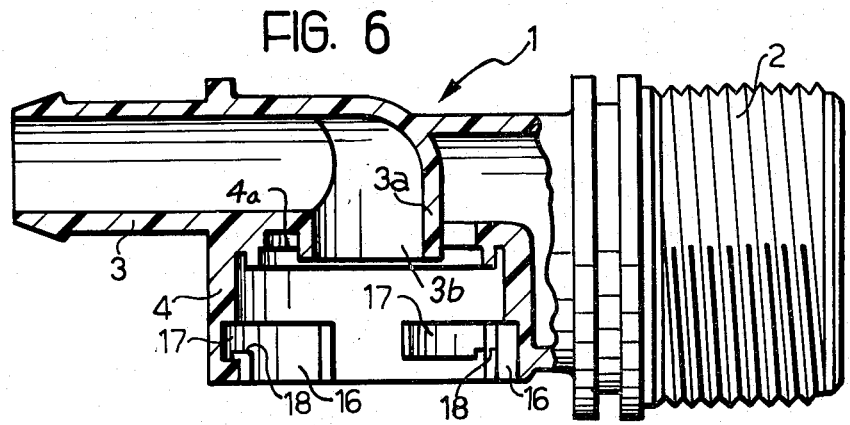

DIFFERENTIAL SOLENOID VALVE FOR FLUID CONTROL

The present invention relates to a differential solenoid valve for the control of fluids, and particularly to a solenoid valve of the type comprising an annular outer chamber, communicating with a fluid inlet, a second chamber, disposed coaxially within the annular outer chamber and communicating with the outer chamber and a fluid outlet, a valve shutter disposed coaxially at one end of the two chambers and axially movable between a first position in which it closes communication between the two chambers and a second position in which it permits communication between the two chambers. The valve shutter is attached to a deformable diaphragm, which is tightly secured at its periphery to the body of the valve and separates the two above mentioned coaxial chambers from a pilot chamber situated on the side of the shutter remote from the two coaxial chambers. To the pilot chamber is fed hydraulic fluid and the relation between the pressure of fluid in the pilot chamber to that in the said outer annular chamber determines the opening and closing of the valve. In the diaphragm or in the movable valve shutter there is provided a calibrated hole through which fluid in the annular outer chamber can pass to the pilot chamber to create a pressure therein which can, at most, be equal in absolute value, to the operating pressure of the fluid. There is a difference in size between the two faces of the diaphragm exposed to the hydraulic pressure so that there is a resultant force on the shutter when the pressures on each side of the diaphragm are equal. This force urges the shutter to the said first position thereof, closing the valve. When the pilot chamber is in communication with an outlet, consisting of an opening of diameter larger than that of the inlet opening, the pressure in the pilot chamber falls and the pressure exerted on the face of the shutter facing the two coaxial chambers prevails; the shutter thus moves towards the second position thereof, thus allowing communication between the inner and outer coaxial chambers, and opening the valve. The opening or closing of the pilot chamber outlet port, through which fluid entering the pilot chamber can leave it, is determined by the position of a movable core of an electromagnet.

In the normal position with the electromagnet de-energized, the movable core of the electromagnet is biased by resilient biasing means to close the pilot chamber outlet port so that the pressure of fluid in the pilot chamber is held at the highest possible value and the valve shutter remains in the closed position, preventing passage of fluid through the valve. When the electromagnet is excited, the core thereof moves to uncover the outlet opening from the pilot chamber and thus the pressure in the pilot chamber falls and the pressure acting on the opposite face of the shutter urges this to move to its second position away from the valve seat, thereby allowing passage of fluid between the inner and outer coaxial chambers and thus through the valve.

The construction of a differential solenoid valve of the type described above includes two main units, an hydraulic unit comprising a valve body having two coaxial chambers communicating with each other and, respectively, with inlet and outlet connections of the valve body, a flat, disc-like valve shutter, a deformable diaphragm and an intermediate element which cooperates with the diaphragm to form the pilot chamber, and an electromagnet unit, comprising a metal armature, a movable core, an excitation coil, and contacts which extend from an insulating cover that encloses the armature and the coil, and by means of which electrical connection to the electromagnet is made.

In known solenoid valves of the type mentioned above the said two main units are joined together by screws which must be capable of withstanding the considerable forces tending to separate the units and generated due to the effect of the hydraulic pressure within the valve. It is therefore necessary to use screws of adequate dimensions and to house them in threaded holes in elements of adequate structural strength to hold the two main units together against the internal forces tending to separate them. This makes automatic assembly of such valves difficult, since complex machinery would be required for locating the screws in the holes and screwing them up.

According to the present invention, there is provided a differential solenoid valve, of the type comprising a valve body having an inlet and an outlet and in which there are provided an outer annular chamber communicating with the inlet, an inner chamber coaxial with the outer chamber and communicating with the outlet, a valve shutter positioned coaxially at one end of the two chambers and movable axially thereof between a first position in which it interrupts communication between the two chambers, and a second position in which it allows communication between the two chambers, a diaphragm of resilient material, the outer periphery of which is tightly secured to the valve body, fixed to said valve shutter, the diaphragm separating the said coaxial inner and outer chambers from a pilot chamber which is formed between the diaphragm and an insert element housed by the valve body, the pilot chamber communicating with the annular outer chamber via a communication passageway and having a discharge opening which communicates with the outlet and which is closable by an axially movable core actuated by an electromagnet, characterized in that said insert element is positioned intermediate the valve body and the electromagnet and comprises a radial flange part forming one wall of the pilot chamber and an axially extending tubular part open at the end carrying the said radial flange part, closed at the other end and housing the movable core of the electromagnet, and resilient biasing means which urge the said core towards the said open end of the tubular part, the intermediate element being attached to the valve body by a locking ring provided with radial projections which engage in recesses in the inner face of the wall of a cylindrical part of the valve body to form a bayonet coupling between the valve body and said intermediate element.

In an embodiment of the present invention the abovementioned difficulties are overcome since the electromagnet unit can be attached to the intermediate element and will not be subject to stresses created by the pressure of the hydraulic fluid in the valve; in addition the coupling of the two units can be effected without the use of screws so that it is possible to assemble them together with automatic apparatus and without any danger of subsequent accidental separation of the two units, which would detract from the operation of the valve, if not its hydraulic sealing.

Two embodiments of the present invention will now be more particularly described, by way of example, with reference to the accompanying drawings, in which:

FIG. 4 is a partial under plan view of the embodiment illustrated in FIGS. 1 to 3;

FIG. 5 is an under plan view of the valve body of the embodiment illustrated in FIGS. 1 to 3;

FIG. 6 is an axial section taken on the line VI—VI of FIG. 5;

FIG. 8 is a partial axial section of a second embodiment of a solenoid valve;

FIG. 9 is a partial axial section of the valve body of the embodiment illustrated in FIG. 8; and FIG. 10 is a partial side view showing a detail of the embodiment of FIG. 8.

FIGS. 1 to 7 show a preferred embodiment of a differential solenoid valve of the present invention: the embodiment illustrated is a single way solenoid valve, but the characteristics of the present invention apply also to two- or more way solenoid valves.

Figure 2:
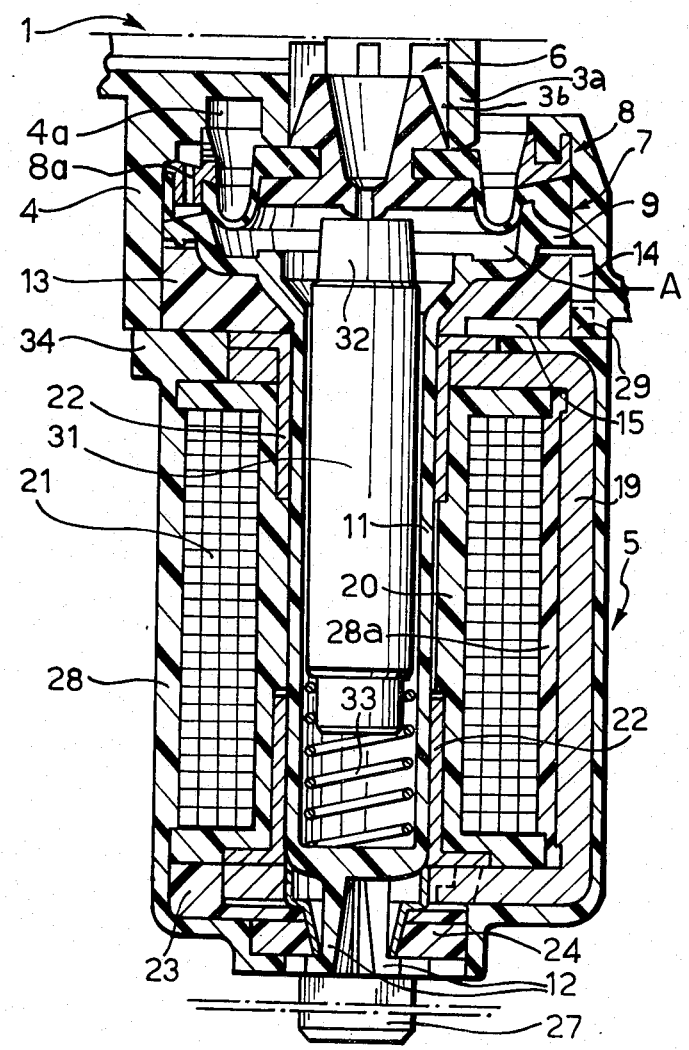
FIG. 2 is a partial axial section, on a larger scale, of the embodiment illustrated in FIG. 1.
Figure 1:
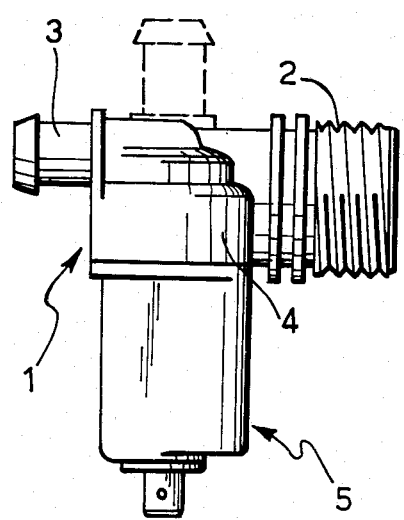
FIG. 1 is a schematic side view of a differential solenoid valve formed as one embodiment of the present invention.
Figure 7:
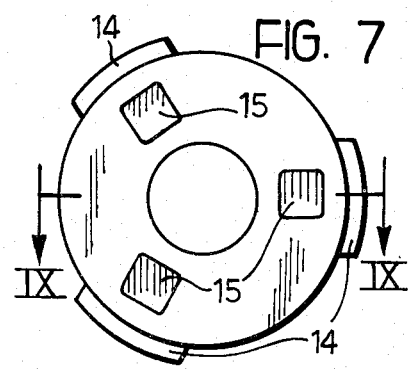
FIG. 7 is an under plan view of a locking ring forming part of the embodiment illustrated in FIGS. 1 to 3.
Figure 3:
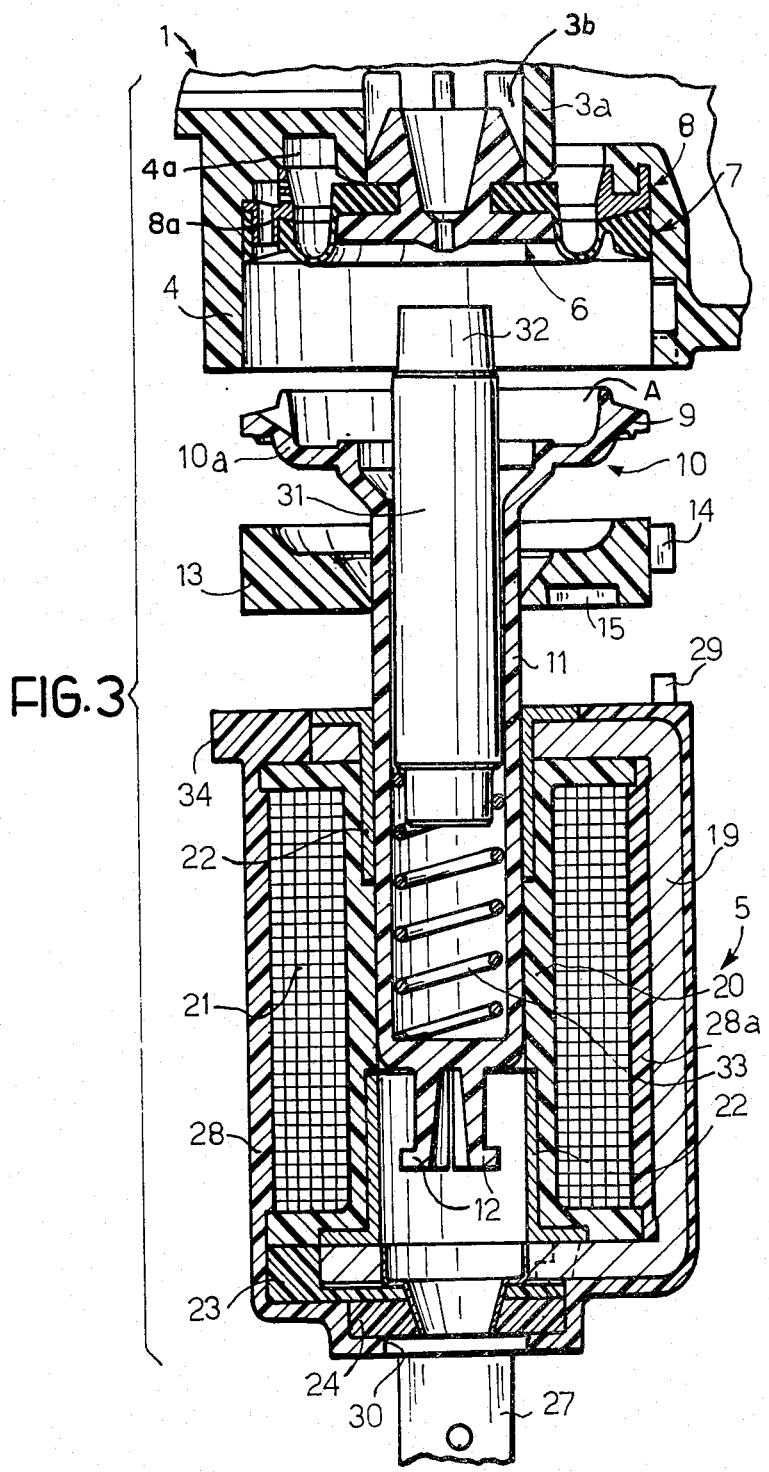
FIG. 3 is a partially exploded axial section corresponding to FIG. 2.

The solenoid valve illustrated in FIGS. 1 to 7 comprises a valve body 1, of plastics material, housing all the components of the hydraulic unit, and an electromagnet unit 5 joined to the base of the hydraulic unit in a manner which will be described below. The body 1 includes a threaded inlet connector 2, a tubular outlet connector 3, which can be disposed in line with the inlet connector as illustrated, or which can form an angle of 90° with it as shown in broken outline in FIG. 1, and a cylindrical lower part 4, communicating with the inlet connector 2 and within which is situated a tubular portion 3a, connected to the outlet connector 3 (see FIG. 6). The tubular portion 3a defines an inner chamber 3b coaxial with an outer annular chamber 4a which communicates with inlet connector 2.

In the chamber defined by the cylindrical portion 4 are disposed, (see FIGS. 2 and 3) a valve shutter 6 partly guided in the cylindrical portion 3a, and a deformable flexible diaphragm 7, attached at its centre to the shutter 6 and peripherally anchored to the cylindrical part 4 of the valve body. The outer part of the diaphragm 7 is interposed between an annular insert element 8 and the peripheral flange 9 of an intermediate element 10 which defines, with the diaphragm 7, a pilot chamber A. Through the annular insert element 8 passes a calibrated axial duct 8a for passage of fluid into the pilot chamber A.

The intermediate element 10 has an upper flange part 10a, for closing the lower part of the pilot chamber A, which is surrounded by an annular flange 9 which seals against the enlarged peripheral part of the flexible diaphragm 7, and a lower tubular part 11, which extends axially downwards and is closed at the base by a transverse wall from the lower face of which project axially a number of resilient teeth 12.

The tubular part 11 of the intermediate element 10 carries a locking ring 13 (see FIG. 7) having a shaped central portion for engaging the flange part 10a of the intermediate element 10. The locking ring 13 has a plurality of radial projections 14 which, upon assembly of the element 10 to the valve body 1, engage in cooperating recesses 16 formed in the inner face of the wall of the cylindrical portion 4 of the body 1. The recesses 16 extend axially and communicate with circumferentially extending recesses 17 so that the locking ring 13 can form a bayonet coupling with the cylindrical part 4 of the body 1 by means of the radial projections 14 and the cooperating recesses 16 and 17. The region where the recesses 16 and 17 merge is restricted by projections 18 past which the projections 14 of the locking ring 13 must be forced when coupling if effected. These projections 18 act to hold the locking ring 13 in position against the possibility of becoming disengaged from the recesses 17. The locking ring 13 is provided on its lower face with a plurality of recesses 15 into which a tool can engage to effect turning of the ring upon bayonet closure of the locking ring 13 to the body 1 so as to lock the intermediate element 10 to the body 1. In this way all the stresses due to the hydraulic pressure in the interior of the valve are taken by the locking ring 13, so that a connection between the hydraulic unit and the electromagnet unit need only be sufficient to keep the two units together. During the coupling of the locking ring 13 to the part 4 of the body 1, the intermediate element 10 must not be allowed to rotate in order to avoid damaging or deforming the diaphragm 7 against which it firmly abuts.

The electromagnet unit 5 is assembled separately from the hydraulic unit; it comprises (see FIGS. 2 and 3) a metal armature 19, a spool 20 of insulating material having a tubular section and two radial flanges one at each end, two small metal flanged tubes 22, inset into respective ends of the spool, a coil 21 wound on the spool, two shaped plates 23, 24 of insulating material carried at one end of the spool and shaped so as to engage two flat pins 27, having squarely folded edges, to which the ends of the coil 21 are connected. The whole assembly of parts is covered with a coating 28 of plastics material, a part 28a of which penetrates between the side of the armature 19 and the coil 21. A shaped opening 30 (see FIG. 4) is formed in the lower part of the coating 28, through which the two connector pins 27 protrude to form electrical terminals for the coil. The central part of the opening 30 exposes a part of the lower plate 24 which has a central hole aligned with a similar hole in the upper plate 23 and with another hole formed in the lower part of the armature 19 to allow the passage of the resilient teeth 12 of the tubular section 11 of the intermediate element 10, for snap engagement of the electromagnet unit to the hydraulic unit. Upon assembly, the electromagnet unit which has been previously assembled is placed over the tubular part 11 of the intermediate element 10, which extends from the base of the hydraulic unit, and slid along this until the resilient teeth 12 enter the aligned holes in the armature and the two plates 23, 24 and snap engage with the lower plate 24 thus effecting the connection.

At the upper end of the insulating cover 28 there is an annular projection 34 which abuts against the lower face of the cylindrical portion 4 of the valve body 1 and which is provided with an axial tooth 29. During assembly of the valve the tooth 29 engages in one of the axial recesses 16 of the cylindrical part 4 of the body 1 to ensure exact positioning of the two units with respect to each other.

The movable core 31 of the electromagnet is housed in the internal cavity of the tubular portion 11 of the intermediate element 10. The core 31 is provided at one end with a cap 32 of elastomeric material and is biased by a helical spring 33 towards a position where the cap 32 abuts the shutter 6 and closes an axial hole therein which constitutes the outlet from the pilot chamber. It will be appreciated that snap assembly of the two units of the solenoid valve can be easily and rapidly effected using automatic apparatus first to insert the flange portion 10a of the intermediate element 10 into the lower cylindrical part 4 of the valve body 1, then to effect twisting of the locking ring to lock the bayonet coupling, and finally to cause relative axial movement of the electromagnet unit along the tubular part 11 to snap engage the teeth 12 into the hole in the insulating plate 24.

FIGS. 8 to 10 show a solenoid valve formed as a second embodiment of the invention: in this embodiment the parts are generally similar to those of the embodiment described in relation to FIGS. 1 to 7. In this embodiment, however, the tubular portion 11' of the shaped element 10 is not provided with resilient teeth and the lower insulating plates 23', 24' of the electromagnet unit 5' do not have central holes. The insulating cover 28' of the electromagnet unit 5' is provided with an upper annular radial flange 34' a short distance from the top of the unit; the upper rim of the insulating cover 28' is provided with a plurality of radial teeth 35 and the axial recesses 16' in the lower tubular part 4' of the valve body are provided, in addition to circumferentially extending communicating recesses 17, with circumferentially extending communicating recesses 36 (see FIG. 9). In this embodiment the cylindrical section 4' of the valve body is a little longer than in the preceding embodiment so that the radial teeth can engage in the circumferential recesses 36 to form a bayonet coupling to secure the cover 28' of the electromagnet unit to the hydraulic unit. The complete locking together of the two units of the solenoid valve is effected by two separate bayonet movements; these comprising a first axial movement, followed by a twisting movement, of the locking ring 13 and then axial movement to penetrate the upper portion of the electromagnet unit into the cylindrical portion 4' of the valve body and a further twisting movement to engage the radial teeth 35 of the electromagnet unit 5' into the recesses 36 of the valve body 1. The coupling is then secured by means of at least one locking device 38, shown in FIG. 10, consisting of a V-shaped element of resilient plastics material having two arms 39, 40 which are inserted into the space between the insulating cover 28' of the electromagnet unit and the axial recess 16, the arm 40 of the V-shape element 38 is provided with a lateral projection 41 which upon assembly is snap engaged into one of the circumferential recesses 17 of the valve body to lock the element 38 into position. The element 38 is provided at its base with a hole 39' to permit engagement of a tool for extraction of the element 38 from its seat when the solenoid valve needs to be dismantled. In this embodiment also the assembly of the two units can be effected with automatic apparatus.

Various changes and modifications can be made to the embodiments described, for example, the engagement of the electromagnet unit to the valve body of the solenoid valve could be effected using a different arrangement, retaining of course, the characteristic attachment of the intermediate element 10.

What is claimed is:
1. In a differential solenoid valve of the type comprising:
   a valve body,
   an inlet from the valve body,
   an outer annular chamber communicating with said inlet,
   an inner chamber coaxial with said outer annular chamber and communicating with said outlet,
   a valve shutter located coaxially at one end of said inner and outer chambers, said valve shutter being movable axially of said chambers between a first position where it interrupts communication between said inner and outer chambers and a second position where it permits communication between said inner and outer chambers,
   a diaphragm of resilient material, said diaphragm being attached to said valve shutter,
   means tightly securing said diaphragm at its periphery to said valve body,
   a fixed lower intermediate element housed in said valve body and defining a cavity in said valve body with which said diaphragm cooperates to define a pilot chamber separated by said diaphragm from said inner and outer coaxial chambers,
   means defining a communication passageway between said pilot chamber and said outer annular chamber,
   means defining a discharge opening between said pilot chamber and said outlet of said valve body, and
   an axially movable electromagnet core the position of which is controlled by an electromagnet to close or open said discharge opening of said pilot chamber,
the improvement wherein:
   said valve body includes a cylindrical part having an inner wall, said diaphragm is housed in said cylindrical part of said valve body,
   recesses in said inner wall of said cylindrical part of said valve body,
   said intermediate element has an axial tubular part with a closed end and an open end, a radial flange part at said open end of said axial tubular part, said radial flange part forming one wall of said pilot chamber, and said axial tubular part housing said movable core of said electromagnet,
   resilient biasing means in said axial tubular part resiliently biasing said movable core of said electromagnet towards said open end of said axial tubular part,
   a locking ring surrounding said axial tubular part of said intermediate element, and
   radial teeth projecting from said locking ring, said radial teeth of said locking ring being engageable in said recesses in said inner wall of said cylindrical part of said valve body to form a bayonet coupling therewith connecting said intermediate element to said valve body.
2. The solenoid valve of claim 1 wherein said recesses on said inner wall of said cylindrical part of said valve body, into which said radial projections on said locking ring engage, comprise, a first part extending axially of said cylindrical part of said valve body and communicating with a rim of said cylindrical part, a second part communicating with said first part and extending circumferentially of said cylindrical part of said valve body, and means defining a restriction in said recesses in the region of communication between said first part and said second part, said restriction acting to hold said radial projections of said locking ring in said second part of said recess against removal therefrom.

3. The solenoid valve of claim 1 wherein said locking ring is provided with a first face disposed adjacent said radial flange part of said intermediate element and a second face opposite said first face having recesses for engagement by an operating tool during assembly and dismantling of said valve.

4. The solenoid valve of claim 1 wherein said first face of said locking ring directed towards said radial flange part of said intermediate element has a frusto conical recess, a frusto-conical part on said radial flange part of said intermediate element matching said frusto-conical recess in said locking ring and permitting relative angular movement of said locking ring with respect to said intermediate element during bayonet assembly of said locking ring to the valve body whereby relative angular movement of said intermediate element and said valve body is avoided thereby avoiding deformation of said diaphragm against which said intermediate element abuts upon assembly.

5. The solenoid valve of claim 1, wherein said closed end of said tubular part of said intermediate element has a plurality of resilient teeth, a central axial bore through said electromagnet, said tubular part of said intermediate element being housed in said bore with said resilient teeth snap engaging in the end of said bore and acting to hold said electromagnet and said intermediate element together.

6. The solenoid valve of claim 5, wherein said electromagnet has an insulating cover, an axial projection on said insulating cover, said axial projection being inserted, upon assembly, into one of said recesses in said inner wall of said cylindrical portion of said valve body to locate said electromagnet angularly against rotation with respect to the valve body.

7. The solenoid valve of claim 1, wherein said electromagnet has an insulating cover, a plurality of radial teeth projecting from one end of said insulating cover, said teeth being insertable into the axial parts of said recesses in said inner wall of said cylindrical portion of said valve body to form a bayonet coupling between said electromagnet and said valve body, further recesses extending circumferentially from and communicating with said axial part of said recesses, said further recesses being axially displaced from said circumferential parts of said recesses in which said radial projections of said locking ring engage upon assembly, said radial teeth of said insulating cover of said electromagnet engaging in said further recesses.

8. The solenoid valve of claim 7, wherein said electromagnet is locked into the assembled position with respect to the valve body by at least one V-shape retaining element having two resilient arms, a lateral projection on one of said two resilient arms, said retaining element being inserted into the axial part of one of said recesses in said cylindrical portion of said valve body with said lateral projection engaged in said circumferential part thereof, and being held in place by the resilience of said two arms, said retaining element acting to prevent separation of said electromagnet from said valve body.

* * * * *